US008433509B2

(12) United States Patent
Hegde

(10) Patent No.: US 8,433,509 B2
(45) Date of Patent: Apr. 30, 2013

(54) POSITION DETERMINATION APPARATUS AND METHOD

(75) Inventor: Rajeev M. Hegde, Staines Middlesex (GB)

(73) Assignee: Samsung Electronics Co., Ltd. (KR)

( * ) Notice: Subject to any disclaimer, the term of this patent is extended or adjusted under 35 U.S.C. 154(b) by 298 days.

(21) Appl. No.: 12/762,819

(22) Filed: Apr. 19, 2010

(65) Prior Publication Data

US 2010/0268465 A1    Oct. 21, 2010

(30) Foreign Application Priority Data

Apr. 17, 2009 (GB) .................................. 0906682.0
Apr. 12, 2010 (KR) ......................... 10-2010-0033445

(51) Int. Cl.
*G01S 11/00* (2006.01)
*G08G 1/123* (2006.01)

(52) U.S. Cl.
USPC .......................... 701/408; 455/456.1; 340/988

(58) Field of Classification Search .................. 701/400, 701/408, 409, 445, 447, 450, 451, 469, 492, 701/532, 300; 455/456.1, 556.1; 340/933, 340/988, 995.25; 342/357.2, 450, 457
See application file for complete search history.

(56) References Cited

U.S. PATENT DOCUMENTS 7,945,270 B2 * 5/2011 Bells et al. ................. 455/456.1

* cited by examiner

*Primary Examiner* — Mark Beauchaine
(74) *Attorney, Agent, or Firm* — The Farrell Law Firm, P.C.

(57) ABSTRACT

A method of determining a location of a User Equipment (UE) is provided. The method includes generating, by the UE, a database of location data for a plurality of locations; receiving at least one navigation signal at a particular area; determining an identity of a cell in which the UE is currently located at the particular area; and determining the location of the UE at the particular area using the at least one navigation signal, the identity of the current cell, and at least a portion of the data stored in the database.

9 Claims, 4 Drawing Sheets

POSITION DETERMINATION APPARATUS AND METHOD

PRIORITY

This application claims priority under 35 U.S.C. §119(a) to an application filed in the United Kingdom Intellectual Property Office on Apr. 17, 2009 and assigned Serial No. 0906682.0, and a Korean Patent Application filed in the Korean Intellectual Property Office on Apr. 12, 2010 and assigned Serial No. 10-2010-0033445, the disclosures of which are incorporated herein by reference.

BACKGROUND OF THE INVENTION

1. Field of the Invention

The present invention relates generally to the field of location (or position) determination, and more particularly to portable User Equipment (UE) adapted to provide a user with an indication of current location.

2. Description of the Related Art

Global Navigation Satellite Systems (GNSS) are well known, as is a portable or mobile UE for use with such systems. These GNSS systems include Global Positioning System (GPS), GLObal NAvigation Satellite System (GLONASS), Galileo, and a compass system (also known as Beidou-2, BD2). Typically, an array (or constellation) of satellites, which are commonly referred to as Space Vehicles (SVs), is arranged to transmit navigation signals for reception by the UE, and from the received navigation signals the UE will calculate its current position. In other words, the UE processes the received signals and makes a location determination yielding an indication of current location.

A plurality of such navigation signals must be received for the UE to be able to calculate its location from just those signals. For example, when using the GPS system, the minimum number of signals required, at least from start-up (or during any other acquisition phase), is four. That is, the UE needs to receive signals from four separate SVs at a particular location in order to make an accurate position determination.

If fewer than the minimum number of signals are received at a particular location, the UE cannot make a position determination. When this occurs, the UE may simply continue to present the user with an indication of the last known position, but this of course has disadvantages. Alternatively, the UE may present a user with a "position unknown" message, but this is also undesirable.

UEs that operate with both GNSS and cellular communications systems (including networks) are also known. Such a UE can take the form of a GPS capable device, which also functions as a mobile phone. It is known for such a UE to be able to determine an identity of a cell of the communication system in which the UE is currently located from a signal or signals received from the system. That is, cellular systems, such as terrestrial communication systems, commonly transmit signals including information indicative of the cell in which they are being transmitted.

With these dual-system devices, it is known for the UE, when at a location in which it is unable to determine a location from received navigation signals (for example, because too few are currently being received), to provide the user with an indication of the cell in which the UE is currently located. Although offering some improvement over a simple "position unknown" signal, this technique still has disadvantages; for example, the user is not provided with an accurate enough indication of position, as the cell covers a wide area.

SUMMARY OF THE INVENTION

Accordingly, the present invention is designed to solve at least the above-mentioned problems occurring in the prior art, and to provide at least the advantages described below.

In accordance with an aspect of the invention there is provided a method of determining a location of a User Equipment (UE). The method includes generating, by the UE, a database of location data for a plurality of locations by performing a location determination for each of the plurality of locations, the location determination being made from a plurality of navigation signals received by the UE at each of the plurality of locations, determining an identity of a respective cell of a cellular communication system in which the UE is located at each of the plurality of locations, and storing data indicating each of the plurality of locations and the respective cell identity for each of the plurality of locations; receiving at least one navigation signal at a particular area; determining an identity of a cell in which the UE is currently located at the particular area; and determining the location of the UE at the particular area using the at least one navigation signal, the identity of the current cell, and at least a portion of the data stored in the database.

In accordance with another aspect of the invention, a method of determining a location of a User Equipment (UE) is provided. The method includes receiving, by the UE, a plurality of navigation signals and information for a cell of a communication system in which the UE is located at a first location; calculating a range of locations for the UE from the received navigation signals; identifying a previously visited location from visited locations stored in the UE as an estimate of the first location, the previously visited location being located within a predetermined distance from the range of locations; and displaying the estimate of the first location to a user.

In accordance with another aspect of the invention, a UE is provided, which includes a satellite communication module for receiving a plurality of navigation signals; a cellular network module for receiving information for a cell of a cellular communication network in which the UE is located; a memory for storing data; and a controller that calculates a range of locations for the UE from the received navigation signals, identifies a previously visited location from visited locations stored in the UE as an estimate of the first location, and displays the estimate of the first location to a user. The previously visited location is located at or within a predetermined distance from the range of locations.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Figure 1:
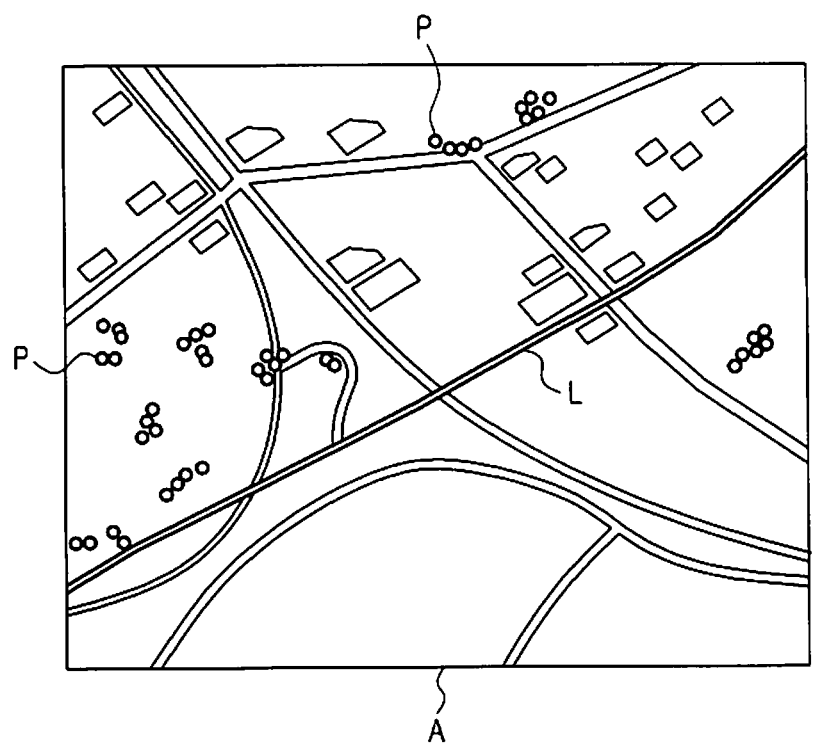
FIG. 1 is a map to illustrating a line of possible user positions calculated from GNSS navigation signals and a plurality of locations previously visited by a UE and having associated data entered in a UE database, according to an embodiment of the present invention.

The following description with reference to the accompanying drawings is provided to assist in a comprehensive understanding of certain embodiments of the invention as defined by the claims and their equivalents. The following description includes various specific details to assist in that understanding, but these are to be regarded as mere examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

It will be appreciated that certain embodiments of the invention are concerned with methods and user equipment that can be used with a variety of GNSS systems, and indeed combinations of such systems, to determine location from received signals. In the following description, embodiments are described which are adapted to determine location from GPS signals. However, it will be appreciated that these are merely examples, and the invention in its broadest sense is not limited to methods or apparatus utilizing just the navigation signals of the GPS system. Additionally, it is noted that "position" and "location" are used interchangeably throughout the description.

Certain embodiments of the invention can be regarded as providing a user history based GPS approximation of location. Often, it can take a long time for a GPS receiver or other GPS-enabled apparatus to acquire signals and synchronize with the system before a user can be provided with an indication of a current position. As mentioned above, the prior art methods make approximations in such situations, using cell identities (cell ID). In contrast, certain methods embodying the present invention use other information, such as user history, along with the cell ID in order to make a more accurate estimate of the user position in situations where it would otherwise be impossible, or at least take a relatively long time to make an accurate estimate of position.

A cellular network is a radio network made up of a number of cells, each served by at least one fixed-location transceiver known as a cell site or base station. When joined together these cells provide radio coverage over a wide geographic area. This enables a large number of user devices (mobile phones, pagers, etc.) to communicate with each other and with fixed transceivers and telephones anywhere in the network, via base stations, even if some of the transceivers are moving through more than one cell during transmission. A user device can receive signals from a base station of the cellular network, and information for the cell covered by the base station, such as a cell ID or the like, is obtained or extracted from the received signals.

To reiterate, previous methods have included methods in which the current cell ID of the user is simply displayed, when it is impossible to obtain a positional fix using just GPS signals, or when it takes too long for the UE determine a more accurate GPS estimate of position using signals from four (or five) satellites. In contrast, certain embodiments of the invention, as will be described below, provide improved methods and apparatuses that are able to provide a user with more accurate estimates of current location in bad coverage areas.

Figure 2:
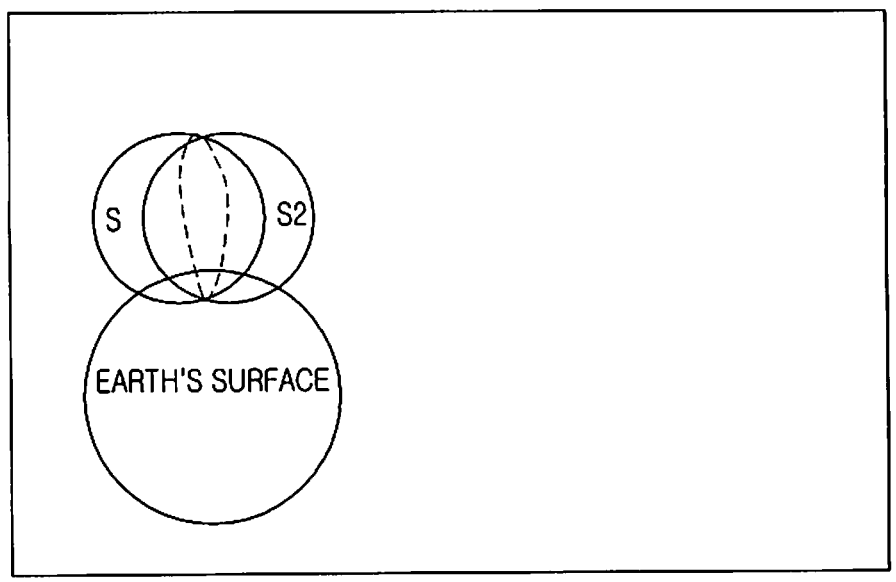
FIG. 2 illustrates a determination of a range of possible positions in accordance with an embodiment of the present invention.

Referring now to FIGS. 1 and 2, in certain embodiments it is a pre-requisite that the UE (mobile device) has the following capabilities:

1. The UE is capable of receiving GPS signals from several satellites and making conventional estimates of user positions;

2. The UE is capable of obtaining Cell ID via a Global System for Mobile communications (GSM) or Code Division Multiple Access (CDMA) modem; and 3. The UE is capable of storing historical data related to user position.

Certain embodiments of the present invention use historical user position data in order to more accurately approximate user position in the absence of quick fixes from, e.g., half of the four satellites.

Certain methods of the present invention can be regarded as having two steps:

1. Intelligently populating and maintaining a database in an efficient and effective manner; and 2. Using this database to calculate approximate user positions These steps will now be described herein below in more detail.

1. Population of a Database

This is a process that runs along the normal GPS activity. The UE continually monitors current GPS performance and enters points into the database, when performance falls below a predefined threshold. If the threshold were defined as 3 minutes, then any location, which took more than 3 minutes for obtaining a fix in a conventional method, would qualify for entry into the database. This, for example, happens either when a user statically waits in a same position for more than 3 minutes (e.g., from the time of receiving at least one navigation signal at the position) and ultimately gets a fix or after moving to a new area to get a fix. Alternatively, the UE may determine a length of time taken between determining the current position and the immediately preceding location determination. The point that is stored is the point at which a fix is obtained. All points where fixes are obtained immediately are not entered to the database.

Table 1 below shows an example of such a database with four fields.

TABLE 1

| User position | Cell ID | Time taken for fix | Frequency - Hits per month |
|---|---|---|---|
| x, y, z | Bond Street | 6 minutes | 8 |
| ... | ... | ... | ... |
| ... | ... | ... | ... |
| ... | ... | ... | ... |

The accuracy of the approximation will increase with an increase in the number of points in the database, i.e., more stored history potentially increases the accuracy. Restrictions, like thresholds, are set to achieve a smaller useful subset of the otherwise large data.

The database in certain embodiments is also regularly maintained so that it remains small and useful. This can be done, for example, by purging entries that are older than a threshold (e.g., a number n of months) and sorting/indexing the database in order of frequency of visits, etc.

Further, all points that are close (e.g., within 10 meters) to other points already in the database may either not be entered initially or may be periodically deleted during maintenance operations.

These operations can also be automatically triggered when the database reaches a maximum limit.

2. Using the Database to Calculate Approximate User Positions

Information regarding the working of conventional GPS is readily available, and will not be repeated at length herein. However, some key concepts required for better understanding the present invention are included.

as described above, for conventional GPS to work the mobile device needs to obtain 4 equations via signal connections from 4 different SVs. Each of these equations has 4 unknowns. Equation (1) below illustrates one of the equations from satellite 1.

$$D=\sqrt{(x_1-x)^2+(y_1-y)^2+(z_1-z)^2}+dt \qquad (1)$$

There are four unknowns in this equation:

x represents x coordinate of the user;

y represents y coordinate of the user' z represents z coordinate of the user; and dt represents a function of the difference in time maintained on the mobile device and the satellites.

The others are known values computed from the packets received from the satellites in question (i.e., from data contained in the SV signals, and extracted from them). More specifically:

D represents the distance between the first SV and the UE, and is calculated using the information from the packets received by the mobile device and the time taken for the packets to be received;

$x_1$ represents the x-coordinate of the first SV's position in three-dimensional space;

$y_1$ represents the y-coordinate of the first SV's position in three dimensional space; and $z_1$ represents the z-coordinate of the first SV's position in the three dimensional space.

A similar equation can be obtained for each satellite whose signals are correctly received and interpreted.

As described above, four such equations are needed to solve for the user position because each of the equations has four unknowns. It is noted that the "dt" presented in these equations is a simplified version. The actual time difference between the UE and the SVs changes as the satellites change. However, because the relative distances between the SVs do not change, calculations can be made so as to have a constant dt factor in each of the four equations.

Problems or delays in obtaining user position arise when it is not possible for the UE to receive and interpret signals from one or more of the four required SVs.

Accordingly, certain embodiments of the present invention help the UE, when the UE has established connection with at least two of the SVs. As described above, certain prior art methods approximate the UE position as the GSM cell ID of the user, whereas certain embodiments of the present invention, although still using the GSM cell ID, provide the user with more accurate approximations of the UE position.

FIG. 1 is used to describe position determination by a UE in accordance with an embodiment of the present invention. In the following description, it will be assumed that the database has already been formed and 2 equations are obtained from two SVs (i.e., 2 of the 4 SV signals required in the conventional method).

Referring to FIG. 1, points P are assumed as those that already exist in the database bearing, the same cell ID as the ID the current cell A (i.e., each point P, only some of which are labeled, corresponds to a location at which a position fix from GPS signals has been difficult in the past).

The line L represents the line of intersection of the two equations (i.e., represents a range, or locus, of possible positions) according to the available GPS signals). Any point on this line theoretically satisfies the two equations obtained from two SVs. This line is also the intersection of the sphere 1: which has SV 1 at its center and Sphere 2: which has SV 2 at its center. The radius of each of the spheres is calculated using a time taken for packets from respective satellites to reach the UE. Essentially the UE is located on an intersection of the surface of both these spheres. Line L in FIG. 1 is the line of intersection of the surface of the two spheres. As described above, two more equations from SVs are needed to narrow down the position of the user within this line.

FIG. 2 more clearly illustrates the intersection of the 2 spheres and the Earth's surface. The dotted black line represents the intersections of the two spheres obtained from 2 equations of respective SVs S and S2. Line L in FIG. 1 is the part of the dotted black line that lies on the Earth's surface in the same cell A as the UE currently is registered to.

A method in accordance with an embodiment of the present invention uses the points in the database to find points that are close to the line L. It should be noted that although the user might have been on open streets, database entries are not made at those points as fixes would have been made sufficiently quickly not to warrant a database entry. In the event that none of the points P are close enough to the line L no approximations are made.

When a point P close to the line L is found, it is reported as the approximate user position. This method works because bad coverage areas do not change and users often visit similar locations frequently.

The following description describes how the equations and the database are used to mathematically determine points P (database entries) that are close to the line L (intersection of the two equations).

Approximating the user position is an iterative process wherein a set procedure is carried out on every point in the database in the same cell ID as the one the UE is currently registered to (i.e. located in).

The steps followed in certain embodiments are listed below.

1. A point Xa1, Ya1, Za1 is picked from the database as an approximation. To check if this is a solution to the 2 equations obtained, the values are substituted into the each of the equations. With method the only unknown left in the equations is (dt).

2. The value of dt is calculated using Xa1, Ya1, Za1 from the first equation. This is maintained in a memory as dt1.

3. Another value of dt is calculated using Xa1, Ya1, Za1, from the second equation. This is also maintained in the memory as dt2.

4. The shortest distance of the point Xa1, Ya1, Za1 to line L from FIG. 1 is directly proportional to the absolute value of a difference between dt1 and dt2. This is maintained in the memory as DIFFa1.

5. Similarly, steps 1 to 4 are repeated for other points in the database (e.g. Xa2, Ya2, Za2).

6. The points are now sorted according to the value of DIFFa for each point.

7. The point with the smallest value of DIFFa is chosen as an approximation if it is below a user defined value, i.e., in circumstances where no points P close enough to the line L are found, no approximate solution is given to the user. In this case, the cell ID is merely reported as the current location.

This method provides an improvement on the prior art because a user often frequents the positions that are stored in the database, and points that have bad GPS coverage historically tend to remain as such.

It will be appreciated that certain embodiments of the invention are able to provide a user with better location approximation in the absence of signals from half of the four SVs, and in the presence of signals, can be used to approximate user positions even after the signals from a first two SVs have been found, and stop when a reasonable approximation has been found, saving power required to receive signals from a further two SVs.

Figure 3:
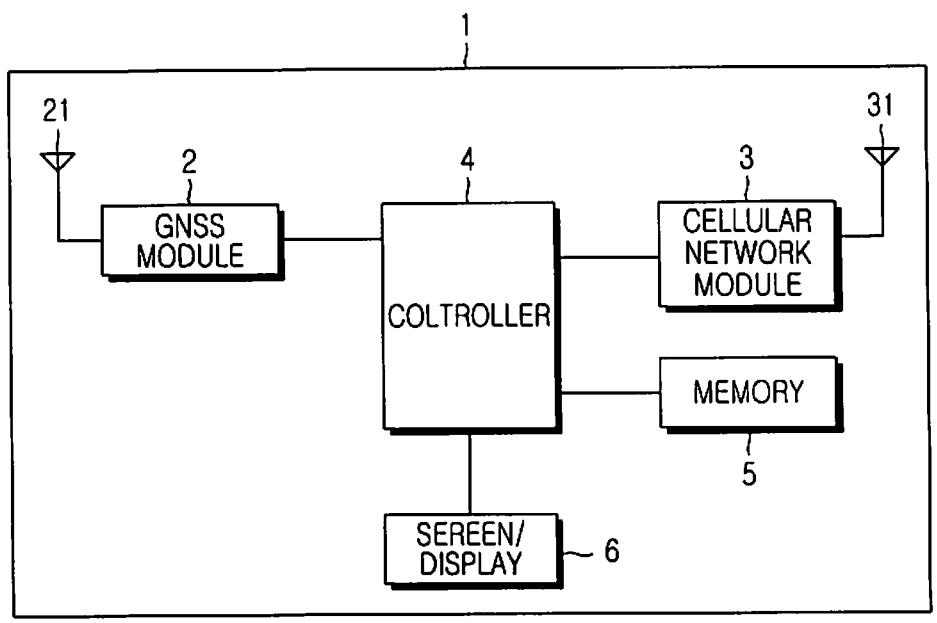
FIG. 3 illustrates a UE in accordance with an embodiment of the present invention.

FIG. 3 illustrates a UE in accordance with an embodiment of the present invention.

Referring to FIG. 3, the UE 1 including a GNSS module 2, which is a satellite (or SV) communication module for receiving navigation signals from SVs by means of an antenna 21 and for processing the received signals to extract navigation data contained therein. In accordance with an embodiment of the present invention, the module 2 passes the extracted data to a controller 4, which processes the extracted data to determine a current location. The UE 1 also includes a cellular network module 3 that receives signals from and sends signals to a wireless communication network by means of an antenna 31. The cellular network module 3 is also connected to the controller 4.

The UE 1 determines its location from a plurality of navigation signals received by the GNSS module 2 and determines an identity of a cell of a cellular communication system or other network in which the UE 1 is located from a signal or signals received by the cellular network module 3.

The UE 1 also includes a memory and a screen/display 6, e.g., a Liquid Crystal Display, etc.

The UE 1 maintains a database in memory 5. The database includes a location history of the UE 1. The location history includes a plurality of previously visited locations at which location determination exceeded a pre-programmed difficulty threshold (such as the length of time taken to make a fix from received navigation signals) and, for each of those visited locations, location history includes the particular cell of the communication system in which the location was situated.

In the UE 1, when positioned at a particular location in which the number of received navigation signals is insufficient for the combination of GNSS module 2 and controller 4 to determine a current location, the controller 4 uses the data from the available navigation signals and the data stored in its memory 5 to calculate an estimated position. An indication of this estimated position is then provided on the screen/display 6.

Figure 4:
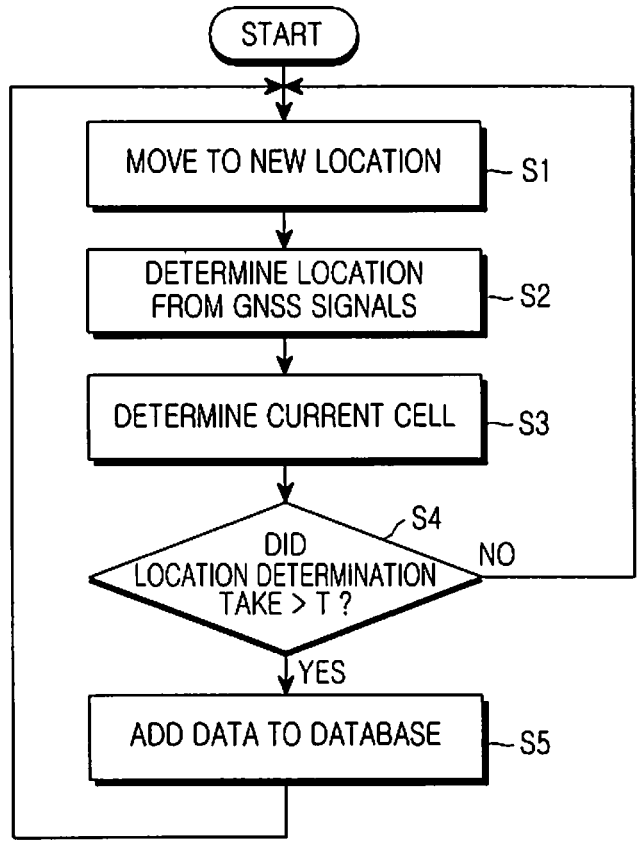
FIG. 4 is a flow chart illustrating a method for creating a database in accordance with an embodiment of the present invention.

FIG. 4 is a flow chart illustrating a method for creating a database in accordance with an embodiment of the present invention.

Referring to FIG. 4, in step S1, a UE is moved or transported to a new location (i.e., a second location). In step S2, the UE determines its current location from navigation signals (e.g., GNSS signals) received at the second location. In step S3, the UE determines an identity of the communication system cell in which it is currently located. Although in this example step S3 follows step S2, step S3 may precede step S2, or steps S2 and S3 may occur simultaneously.

In step S4, the UE determines whether the location determination from navigation signals took longer than a predetermined length of time T. Alternatively, step S4 may be replaced by a different method of assessing difficulty with the previous location determination.

If the location determination from the navigation signals did not take longer than a predetermined length of time T, then a database is not updated, and the method returns to step S1, ready for the UE to be transported to a new location.

However, if the location determination was relatively difficult, and the location determination from the navigation signals took longer than a predetermined length of time T, in step S5, data about the current location is added to a database stored in UE memory.

Using the method of FIG. 4, a database is created with data corresponding to locations (i.e., difficult locations) in which location determinations have been made with some difficulty, according to a certain difficulty criterion. If easy locations are required for other purposes, the easy locations and the difficult locations may be classified and stored separately. For example, the difficult locations may be stored in a first database, and the easy locations may be stored in a second database. Alternatively, the easy and difficult locations may be stored in the same database, wherein the easy and difficult locations have different identifiers, such as D (Difficult) and E (Easy).

Figure 5:
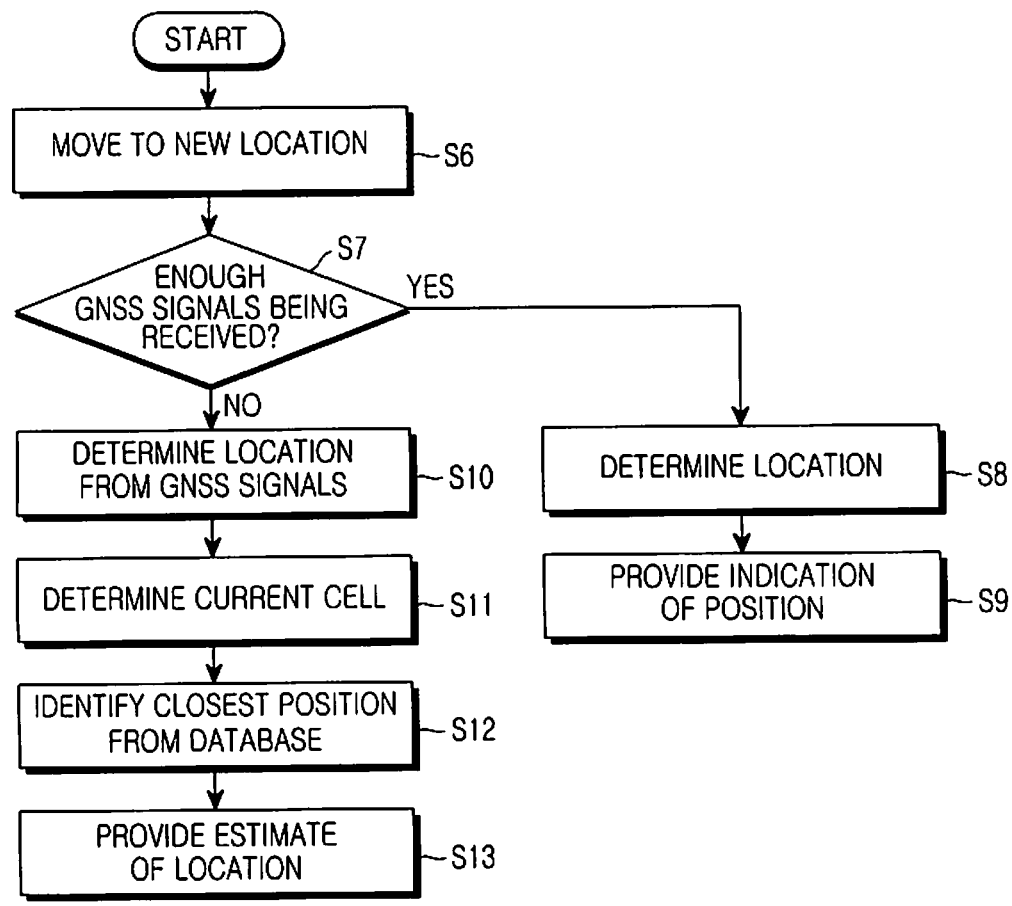
FIG. 5 is a flow chart illustrating a method for position location in accordance with an embodiment of the present invention.

FIG. 5 is a flow chart illustrating a method for position location in accordance with an embodiment of the present invention.

Referring now to FIG. 5, after having built up a database, in step S6, the UE may be moved to a new location. In step S7, the UE determines whether enough navigation signals (e.g., GNSS signals) are being received at the current location in order to make a determination of location from just those signals. If yes, the location determination is made from the GNSS signals in step S8, and an indication of the position based on this location determination is provided to a user in step S9.

However, if an insufficient number of GNSS signals is being received in step S7, then UE pinpoints the current location as far as possible from the available GNSS signals in step S10. For example, from just two GNSS signals the UE may be able to calculate a line of positions on the Earth's surface representing the possible current locations. In step S11 the UE determines the current communication cell in which it is located. Again, as described above, step S11 may precede step S10, or be performed in parallel with it.

In step S12, in which the UE identifies the previously visited location in the database, which is both in the current cell and closest to the range of locations determined from the currently received GNSS signals. The method may also comprise taking into account the frequency of visits to that location, or otherwise weight the data. Finally, in step S13 the appropriate estimate of location is provided to a user.

It will be appreciated that in certain embodiments of the invention it is important not to store locations where a fix was obtained immediately, as one can rule out these locations from consideration at the approximate position at a later time when location determination from navigation signals is proving impossible or difficult. The idea behind this is that, if it takes a long time now to calculate position from navigation signals, it is highly likely to have taken a long time earlier. As further explanation, if all locations were stored in a database such that the database also indicated locations at which good fixes were obtained (i.e., where position determinations were obtained very quickly) then at a later time these "good" locations could be wrongly picked by the method or apparatus and used as estimates of current position for the user. Certain embodiments of the invention avoid this behavior. If a user is at a location at which it is proving to be impossible or difficult to obtain a position fix quickly, it is unlikely that this current location is a location at which position determination has been previously made with ease. In other words, if location determination is currently proving difficult, and sometime has already passed, it is likely that the user is in one of the bad coverage areas, or equivalently a difficult location, and if the user has been in this location before, it should be indicated in the database.

It will be appreciated that certain embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing a system or method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method of determining a location of a User Equipment (UE), the method comprising:
    generating, by the UE, a database of location data for a plurality of locations by:
        performing a location determination for each of the plurality of locations, the location determination being made from a plurality of navigation signals received by the UE at each of the plurality of locations;
        determining a level of difficulty for each location determination according to at least one predetermined criterion;
        determining an identity of a respective cell of a cellular communication system in which the UE is located at each of the plurality of locations; and
        storing data indicating each of the plurality of locations and the respective cell identity for each of the plurality of locations, when the level of difficulty for each location determination is greater than the at least one predetermined criterion;
    receiving at least one navigation signal at a particular area;
    determining an identity of a cell in which the UE is currently located at the particular area; and
    determining the location of the UE at the particular area using the at least one navigation signal, the identity of the current cell, and at least a portion of the data stored in the database.

2. The method of claim 1, wherein determining the level of difficulty for each location determination comprises determining a time required for each location determination.

3. The method of claim 2, wherein determining the level of difficulty for each location determination further comprises determining whether the time required for each location determination is greater than a predetermined length of time.

4. A method of determining a location of a User Equipment (UE), the method comprising:
    receiving, by the UE, a plurality of navigation signals and information for a cell of a communication system in which the UE is located at a first location;
    calculating a range of locations for the UE from the received navigation signals;
    identifying a previously visited location from visited locations stored in the UE as an estimate of the first location, the previously visited location being located within a predetermined distance from the range of locations; and
    displaying the estimate of the first location to a user.

5. The method in accordance with claim 4, further comprising:
    receiving a plurality of navigation signals at a second location;
    determining the second location from the received plurality of navigation signals;
    comparing a length of time taken to determine the second location with a predetermined length of time; and
    storing the second position as a visited location in the UE according to the comparison result.

6. The method in accordance with claim 4, wherein identifying the previously visited location is performed based on a distance between each visited location and the range of locations and a number of times the UE has made a location determination at or within a predetermined distance from said each visited location.

7. The method in accordance with claim 4, wherein calculating the range of the locations for the UE comprises:
    calculating a length of time taken for each navigation signal from a corresponding one of space vehicles to reach the UE;
    obtaining virtual spheres, which are centered on the space vehicles, respectively; and
    determining at least part of a line of intersection of the virtual spheres on the Earth's surface as the range of locations for the UE.

8. The method in accordance with claim 4, wherein calculating the range of the locations for the UE comprises:
    calculating a length of time taken for each navigation signal from a corresponding one of space vehicles to reach the UE;
    calculating distances from each of the space vehicles to the UE based on said length of time; and
    determining the range of locations for the UE on the Earth's surface based on the distances.

9. A User Equipment (UE) comprising:
    a satellite communication module for receiving a plurality of navigation signals;
    a cellular network module for receiving information for a cell of a cellular communication network in which the UE is located;
    a memory for storing data; and
    a controller that calculates a range of locations for the UE from the received navigation signals, identifies a previously visited location from visited locations stored in the UE as an estimate of the first location, and displays the estimate of the first location to a user,
    wherein the previously visited location is located at or within a predetermined distance from the range of locations.

* * * * *